(12) United States Patent
Min

(10) Patent No.: US 6,476,861 B1
(45) Date of Patent: Nov. 5, 2002

(54) VIDEO CAMERA HAVING DISPLAY FOR DISPLAYING MOVEMENT SPEED AND HAND WOBBLE

(75) Inventor: Byung-Seog Min, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 689 days.

(21) Appl. No.: 08/840,624

(22) Filed: Apr. 25, 1997

(30) Foreign Application Priority Data

Apr. 27, 1996 (KR) ............................................. 96-13316

(51) Int. Cl.$^7$ ............................................. H04N 5/228
(52) U.S. Cl. ...................................................... 348/208
(58) Field of Search .................... 348/208; H04N 5/228

(56) References Cited

U.S. PATENT DOCUMENTS

| | | | | |
|---|---|---|---|---|
| 4,862,277 A | * | 8/1989 | Iwaibana .................... | 348/208 |
| 5,267,034 A | * | 11/1993 | Miyatake et al. .......... | 348/208 |
| 5,282,044 A | * | 1/1994 | Misawa et al. ............. | 348/208 |
| 5,517,238 A | * | 5/1996 | Hirasawa .................... | 348/208 |
| 5,585,875 A | * | 12/1996 | Imafuji et al. .............. | 348/208 |
| 5,805,212 A | * | 9/1998 | Fujiwara ..................... | 348/208 |

FOREIGN PATENT DOCUMENTS

EP          0 318 780 A2     4/1989

* cited by examiner

Primary Examiner—Wendy R. Garber
Assistant Examiner—Luong Nguyen
(74) Attorney, Agent, or Firm—Sughrue Mion, PLLC

(57) ABSTRACT

A video camera that displays movement speed and hand wobble to allow a photographer to perform a stable photographing operation. The video camera detects up and down movement and left and right movement. The video camera discerns a detection signal as hand wobble when the detection signal is a periodic waveform having a predetermined frequency component, and discerns the detection signal as camera movement when the detection signal is a waveform having a constant amplitude without a frequency component. The video camera discriminates whether the detected hand wobble and movement speed are equal or greater than a reference value and a reference speed, respectively, and displays the hand wobble and movement speed quantitatively on a monitor, such as an electronic viewfinder. The video camera also displays a warning message to make the photographer recognize a current photographing state.

13 Claims, 5 Drawing Sheets

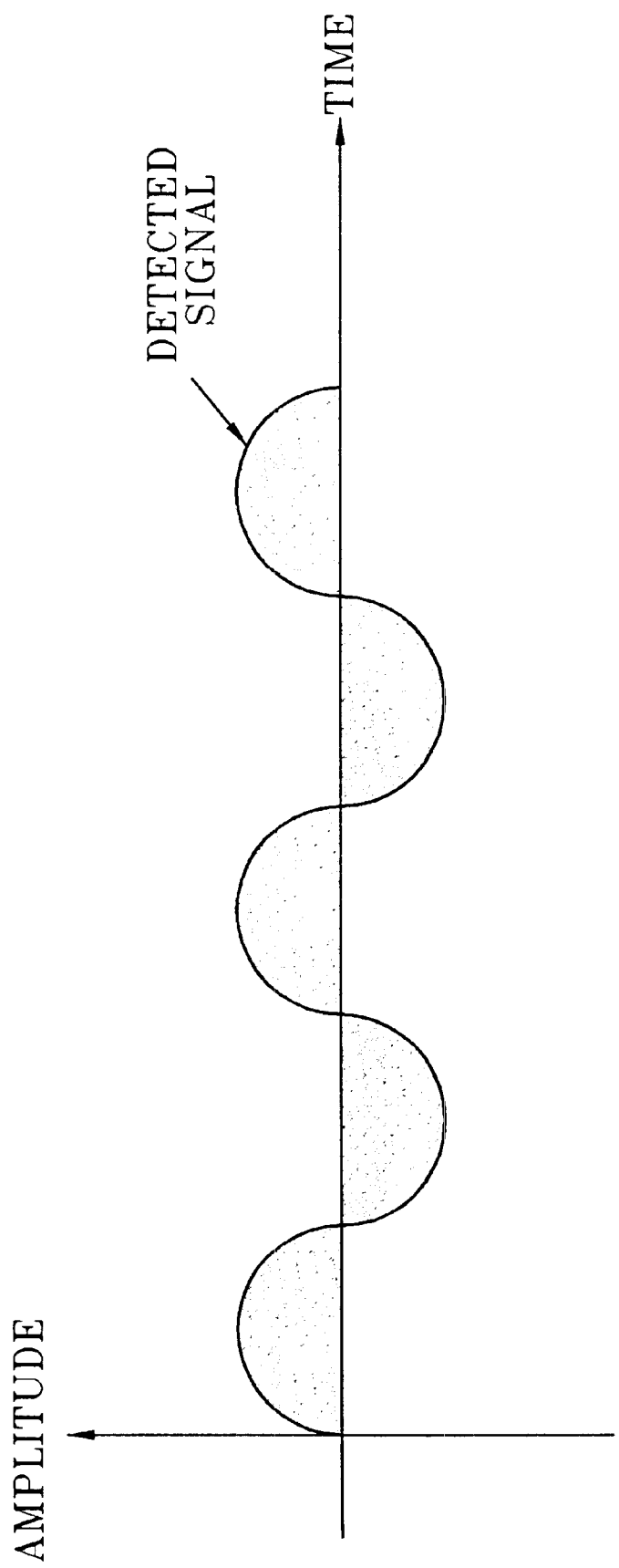

VIDEO CAMERA HAVING DISPLAY FOR DISPLAYING MOVEMENT SPEED AND HAND WOBBLE

BACKGROUND OF THE INVENTION

The present invention relates to a video camera for photographing an object stably, and more particularly, to a video camera having a display for displaying movement speed and hand wobble, in which an object can be photographed under a stable photographing condition by detecting hand wobble and movement speed of a user of the video camera and displaying the detected conditions to make the user recognize them.

Since video cameras have become compact and light, they can be supported by a user's hand. Thus, when an object is photographed using a video camera, the picture may shake due to hand wobble of the user. As a result, most video cameras have a hand wobble correction system to correct the picture shaking due to hand wobble.

U.S. Pat. No. 4,862,277, entitled "Image Device With Hand Wobble Display Circuit", is related to this problem. In the above U.S. patent, a one-frame video signal obtained from a camera is stored and a difference signal between the stored one-frame video signal and a previous frame video signal is obtained. A hand wobble degree is determined by comparing the magnitude of the difference signal with a respectively different threshold value, and warning lamps are turned on stepwise according to the determined hand wobble degree, to inform the photographer of the hand wobble warning and to enable him or her to photograph the object under a stable condition.

Also, a recent video camera adopting a high magnification such as 8-, 10-, 12-, 20-times, . . . in the case of a general zoom, and 20-, 64-times, . . . in the case of a digital zoom, can correct hand wobble adaptively, according to magnification of the zoom. Thus, the user who photographs an object using such a video camera rarely experiences picture shaking on a screen due to correction of the hand wobble. However, the video camera adopting this hand wobble correction system cannot obtain a desired picture since a reproduced picture moves too fast during reproducing if an object is photographed at a predetermined speed or higher.

SUMMARY OF THE INVENTION

To solve the above problems, it is an object of the present invention to provide a video camera having a display for displaying movement speed and hand wobble, to enable a user to perform a desired stable photographing, by detecting a photographing state such as a movement speed and hand wobble of the video camera and making the user recognize the detected conditions.

To accomplish the above object of the present invention, there is provided a video camera including: a sensor that detects movement of the video camera and outputs a detection signal; a detector that detects a movement speed and hand wobble of the video camera based on the detection signal output from the sensor; a discrimination controller, responsive to the detector, that outputs a control signal for displaying the movement speed and the hand wobble; and a display that displays the movement speed and the hand wobble in response to the control signal output from the discrimination controller.

BRIEF DESCRIPTION OF THE DRAWINGS

The preferred embodiments are described with reference to the drawings wherein:

FIGS. 2A and 2B are waveform diagrams showing detected signals of the sensor portion of FIG. 1.

DETAILED DESCRIPTION OF THE PREFERRED EMBODIMENT

A preferred embodiment of the present invention will be described with reference to the accompanying FIG. 1.

Figure 1:
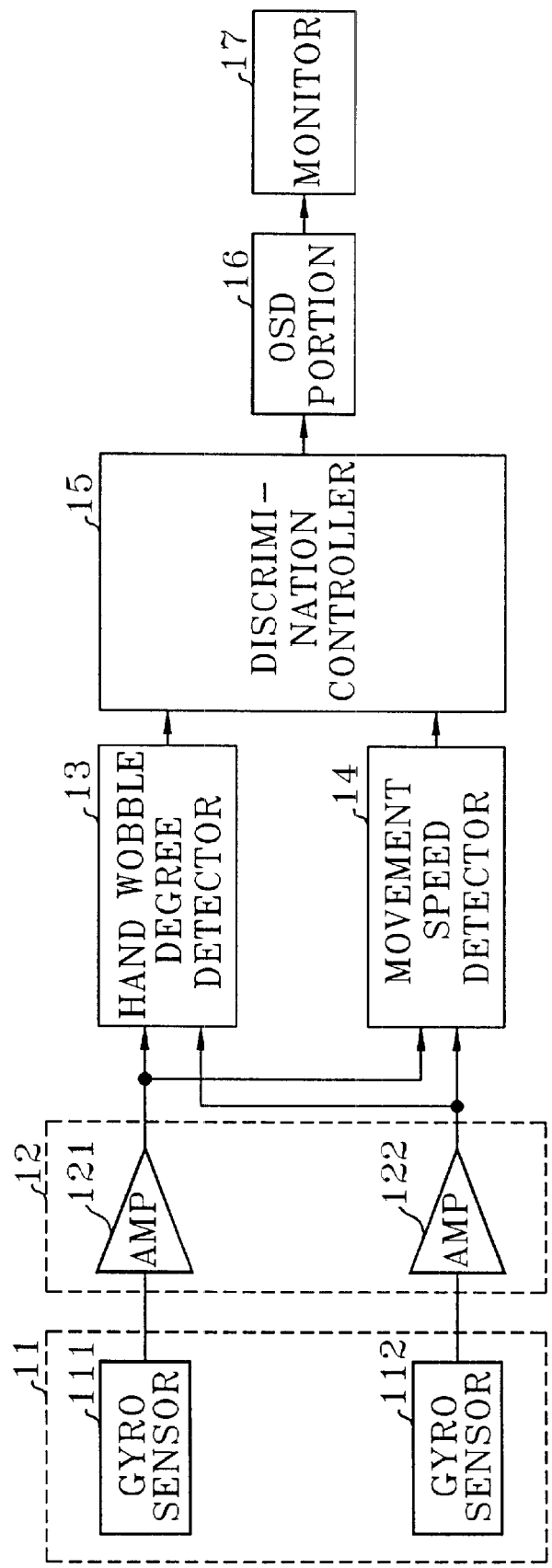
FIG. 1 is a block diagram showing a display for displaying movement speed and hand wobble of a video camera according to the present invention.

FIG. 1 shows a display for displaying movement speed and hand wobble of a video camera according to the present invention. The display includes a sensor portion 11 for detecting wobble and movement in up, down, left and right directions. The sensor portion 11 includes a plurality of gyro sensors, e.g., two gyro sensors 111 and 112 in this embodiment. An amplifier portion 12 amplifies the detection signal with respect to the up, down, left and right wobble and movement of the video camera output from the sensor portion 11 by a predetermined amplification factor. The amplifier portion 12 includes a plurality of amplifiers, e.g., two amplifiers 121 and 122 in this embodiment in correspondence to the plurality of the gyro sensors 111 and 112. Also, the display includes a hand wobble degree detector 13 and a movement speed detector 14 for respectively detecting movement speed and hand wobble of the video camera by receiving the amplified detection signal output from the amplifier portion 12. A discrimination controller 15 discriminates whether the hand wobble degree and the movement speed output from the hand wobble degree detector 13 and the movement speed detector 14 are greater than a preset reference value and reference speed, respectively, and outputs a control signal for displaying a warning message and detected hand wobble degree and movement speed according to the discriminated result. An on-screen-display (OSD) portion 16 outputs OSD data with respect to the hand wobble degree and the movement speed detected according to the control signal output from the discrimination controller 15 and the warning message. A monitor 17 receives the OSD data output from the. OSD portion 16 and displays the same. An electronic viewfinder or a liquid display, for example, may be used as the monitor 17.

During photographing, the photographer moves at a random speed while watching an electronic viewfinder attached to the video camera. In this case, the portion 11 detects up, down, left and right movement of the video camera. The two gyro sensors 111 and 112 that form the sensor portion 11 detect angular velocities. An inertial space about at least one axis perpendicular to a spin axis is used as a reference. That is, the first gyro sensor 111 detects an angular velocity when the video camera moves up and down, and the second gyro sensor 112 detects an angular velocity when the video camera moves left and right. The detection signals output from the sensor portion 11 are shown in FIGS. 2A and 2B.

Figure 2B:
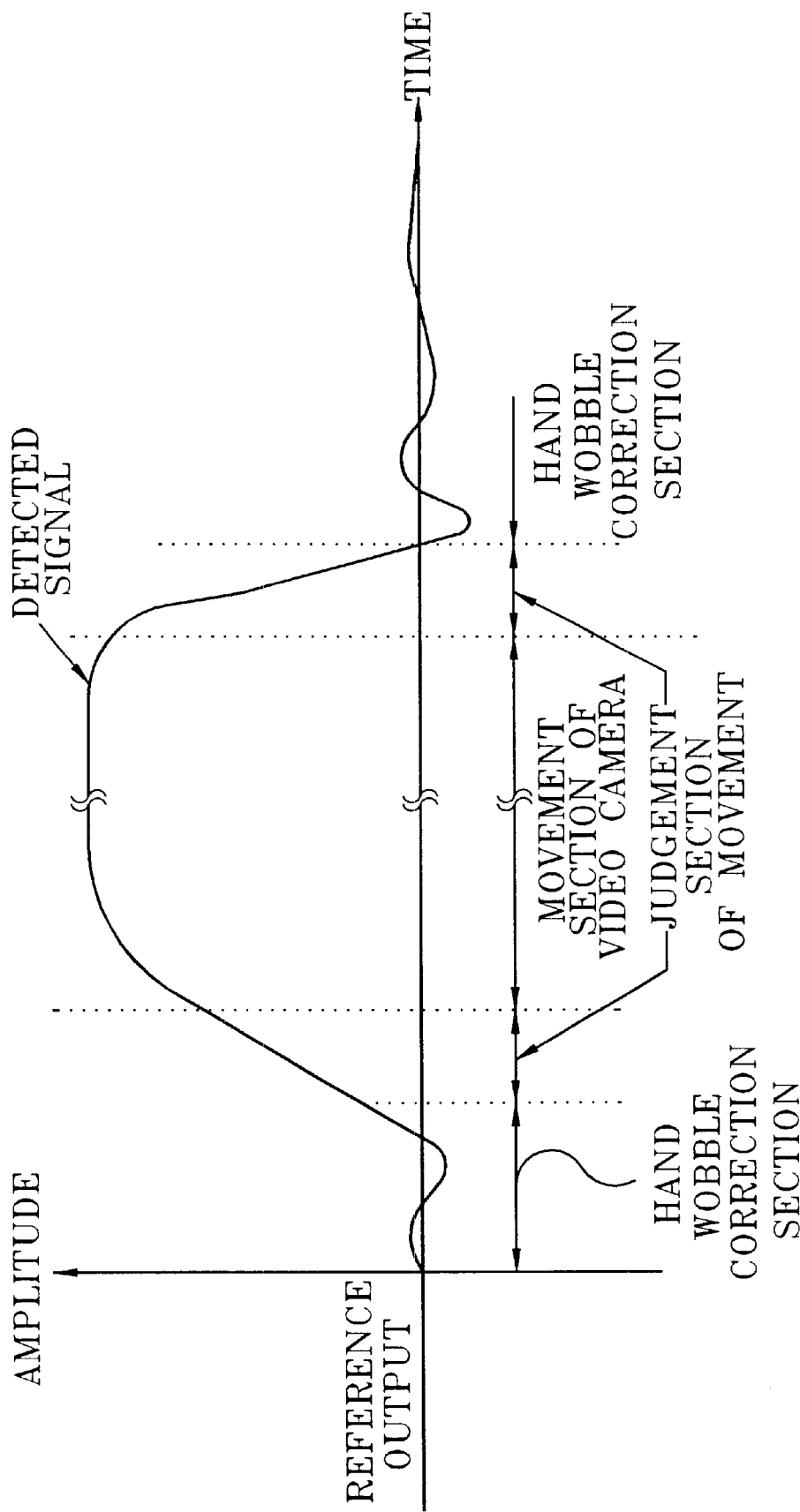

FIG. 2A is a detection signal of the sensor portion 11 when the video camera movement is due to the hand wobble, and FIG. 2B is a detection signal of the sensor portion 11 when the video camera movement is due to both the hand wobble and the movement.

Referring to FIG. 2A, the detection signal output from the sensor portion 11 becomes a periodical waveform of a frequency of about 0.5–1.5 Hz, when the video camera shakes up, down, left or right. Also, when the video camera moves up, down, left or right for photographing, the detection signal output from the sensor portion 11 becomes a waveform of a constant amplitude without having a frequency component. Referring to FIG. 2B, the detection signal becomes a periodical waveform and a constant amplitude waveform, in correspondence to the video camera's up, down, left or right shaking and movement, and becomes an identical pattern of up and down or left and right symmetry with respect to a reference output. That is, the output pattern of the sensor portion 11 when the video camera moves upwards, is same as that when the video camera moves downwards. The output patterns are also the same when the video camera moves to the left and right. As a result, the wobble and movement of the video camera can be discerned according to the pattern of the waveform of the detection signal. Thus, hand wobble and movement speed and direction of the video camera can be detected from the output signals of the gyro sensors 111 and 112.

The detection signals output from the two gyro sensors 111 and 112 in the sensor portion 11 are input to corresponding amplifiers 121 and 122, respectively. The two amplifiers 121 and 122 of the amplifier portion 12 amplify the input detection signals by a predetermined amplification factor and output the amplified results to the hand wobble degree detector 13 and the movement speed detector 14. The hand wobble degree detector 13 determines whether the video camera movement is due to up and down or left and right shaking via the waveform pattern of the amplified detected signal output from the two amplifiers 121 and 122. The hand wobble degree detector 13 judges shaking if the detection signal is a periodical waveform having a constant frequency component. The hand wobble degree detector 13 integrates the detection signal in the hand wobble correction section of FIG. 2B which is determined as shaking and detects the hand wobble degree. The movement speed detector 14 determines whether the video camera movement is due to up and down or left and right movement via the waveform pattern of the amplified detection signal output from the two amplifiers 121 and 122. The movement speed detector 14 judges movement if the detection signal is a waveform of a constant amplitude without having a frequency component. The movement speed detector 14 integrates the detection signal in the video camera movement section of FIG. 2B to detect a movement speed. The discrimination controller 15 compares the detected hand wobble degree and movement speed output from the hand wobble degree detector 13 and the movement speed detector 14 with a predetermined reference value and a reference speed, respectively, to discriminate whether the hand wobble degree and the movement speed are same as the reference value and the reference speed. The discrimination controller 15 controls the OSD portion 16 to make the monitor 17 quantitatively display the hand wobble degree. The discrimination controller 15 controls the OSD portion 16 in such a manner that the detected movement speed is displayed, for example, as a number on the monitor 17. Also, the discrimination controller 15 controls the OSD portion 16 in such a manner that a warning message is displayed on the monitor 17 to inform the user of severe wobble when the detected hand wobble degree is equal or greater than the reference value. The warning message displayed on the monitor 17 informs the user to slow the movement speed of the video camera when the movement speed is equal to or greater than the reference speed. Meanwhile, the OSD portion 16 displays the pictures as shown in FIGS. 3A–3C on the monitor 17, such as an electronic viewfinder or a liquid display attached to the video camera, under the control of the discrimination controller 15.

Figure 3A:
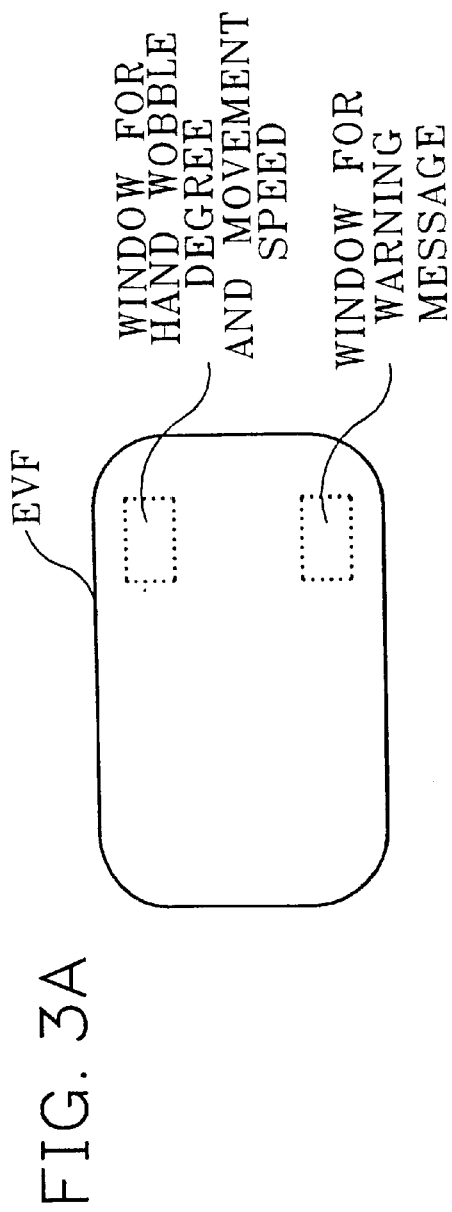
FIGS. 3A, 3B and 3C are diagrams showing representation patterns of the monitor in FIG. 1.
Figure 3B:
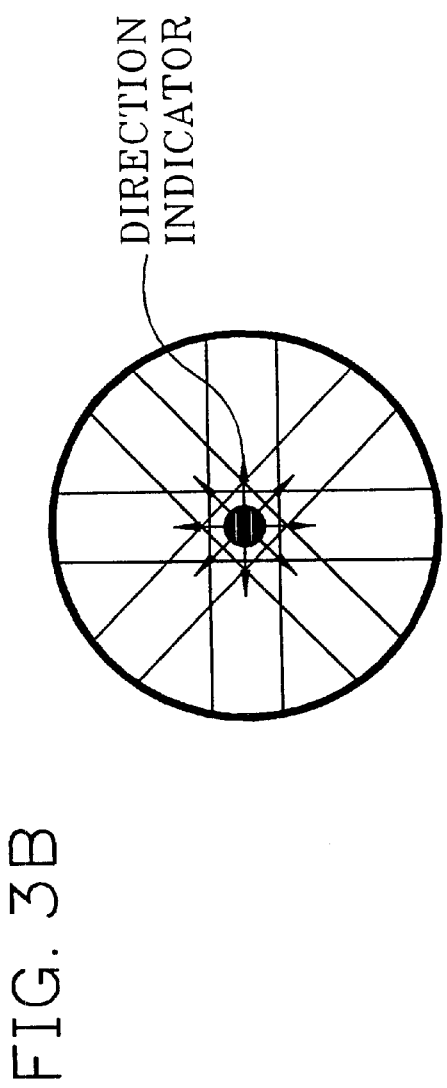
Figure 3C:
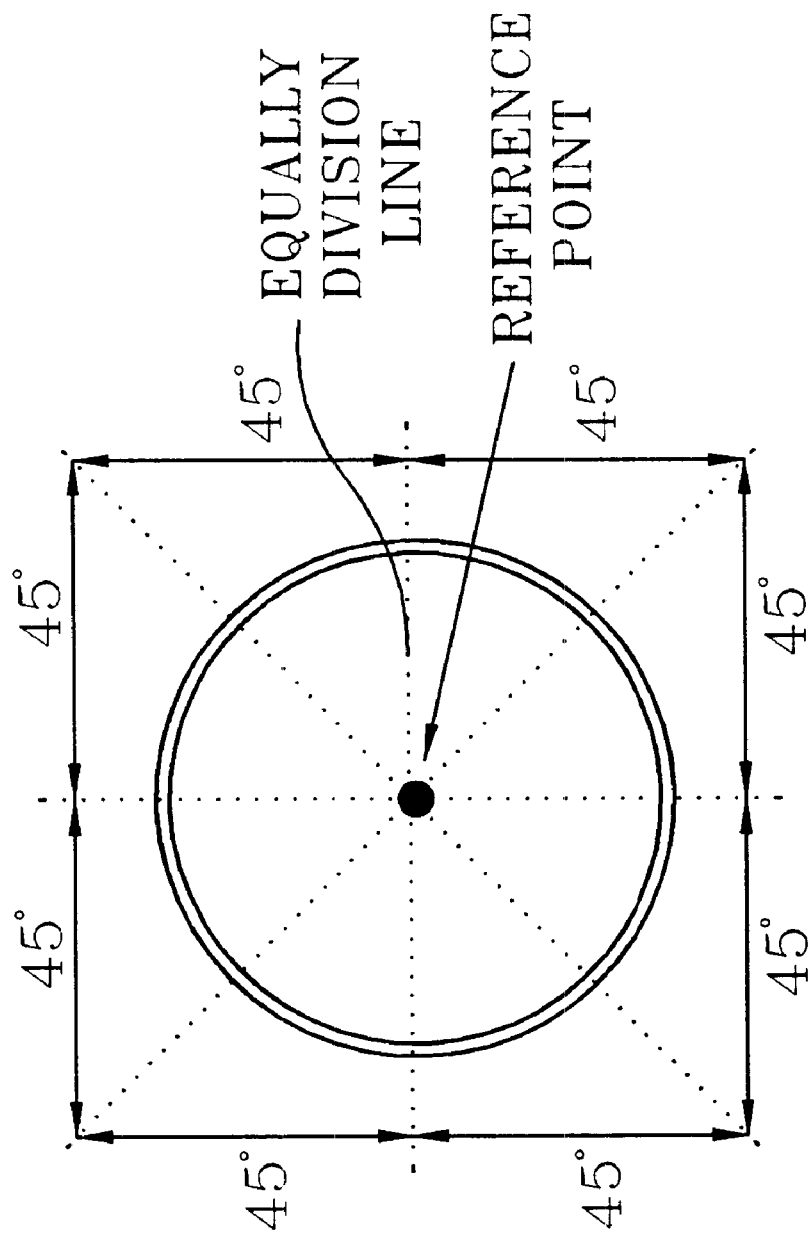

As shown in FIG. 3A, the monitor 17 may include an electronic viewfinder (EVF) having a window for displaying the hand wobble degree and the movement speed and another window for displaying the warning message. FIG. 3B shows an example of the pattern representing the hand wobble degree and the movement direction displayed in the hand wobble degree and movement speed window. FIG. 3C shows the detailed pattern of FIG. 3B.

Referring to FIG. 3A, the OSD portion 16 designates hand wobble degree and movement speed representation windows and a warning message representation window at predetermined positions on the monitor 17, respectively. Also, the OSD portion 16 represents quantitatively the hand wobble degree and the movement direction on the hand wobble degree and movement speed representation window of the monitor 17. That is, referring to FIG. 3B, the direction of the movement speed is represented as a direction indicator of an arrow on the hand wobble degree and movement speed representation window. The direction indicator is shown on the up, down, left and right diagonal lines by equally dividing the circumference at a predetermined angle from the center of the circle having a predetermined radius. Referring to FIG. 3C as an example, the circumference of the circle is divided into eight 45° sectors from the center thereof, and the movement direction is represented on one of the sectors. Of course, the circumference can be divided into any desired sectors. The equally divided sectors represent the magnitude and direction of the hand wobble degree of the video camera via the indicator from the center. The video camera movement is represented up to a predetermined step by which the indicator divides the movement direction. Also, the magnitude of the current movement speed is represented as a number on the hand wobble degree and movement speed representation windows. Thus, the present invention permits stable photographing by making the photographer photograph the object while watching the direction and the moving speed.

Meanwhile, the OSD portion 16 displays a warning message (such as, for example, "SEVERE WOBBLE") on a warning message window of the monitor 17 since a stable picture cannot be obtained due to severe wobble when the wobble degree is equal or greater than a reference value. The OSD portion 16 displays a warning message (such as, for example, "MOVING TOO FAST") on a warning message window of the monitor 17 when the movement speed is equal or greater than a reference speed. Thus., the photographer can photograph the object while moving at a predetermined speed.

As described above, the video camera according to the present invention uses the waveform pattern of the movement detection signal of the video camera to discriminate hand wobble and movement, and displays the hand wobble degree and the movement speed to make the user easily recognize them. When the hand wobble degree and the movement speed are equal or greater than the reference value and the reference speed, respectively, warning messages are displayed to make the photographer recognize the photographing state to enable a desired stable photographing to be performed.

Although a preferred embodiment of the invention has been specifically described herein, numerous modifications may be made thereto without departing from the spirit and scope of the invention.

What is claimed is:

1. A video camera comprising:

an angular sensor that detects movement of the video camera and outputs a detection signal;

a detector that detects a movement speed and hand wobble of the video camera based on the detection signal output from said sensor;

a discrimination controller, responsive to said detector, that outputs a control signal for displaying the movement speed and the hand wobble; and a display that displays the movement of speed and the hand wobble in response to the control signal output from said discrimination controller, wherein said detector discerns whether the movement of the video camera is due to hand wobble or photographing movement in accordance with waveform pattern of the detection signal.

2. The video camera according to claim 1, wherein said sensor comprises a plurality of sensors for detecting up and down movement and left and right movement of the video camera.

3. The video camera according to claim 2, wherein said sensor further comprises an amplifier that amplifies the detection signal by a predetermined amplification factor and outputs an amplified detection signal.

4. The video camera according to claim 1, wherein said detector discerns the detection signal as hand wobble when the detection signal is a periodic waveform having a predetermined frequency component, and said detector discerns the detection signal as photographing movement when the detection signal is a waveform having a substantially constant amplitude without a frequency component.

5. The video camera according to claim 4, wherein said detector comprises:

a hand wobble degree detector that integrates the detection signal discerned as the hand wobble and outputs an integrated result indicating the magnitude of hand wobble; and a movement speed detector that integrates the detection signal discerned as the photographing movement and outputs an integrated result indicating the movement speed.

6. The video camera according to claim 1, wherein said discrimination controller comprises a comparator which compares the movement speed and the hand wobble with respective reference values.

7. The video camera according to claim 6, wherein said discrimination controller outputs a warning signal to said display when the movement speed and the hand wobble detected by said detector exceed said respective reference values.

8. The video camera according to claim 7, wherein said display comprises a window for displaying said warning signal.

9. The video camera according to claim 1, wherein said display comprises a window for displaying the hand wobble and the movement speed.

10. The video camera according to claim 9, wherein said display displays a magnitude of the hand wobble.

11. The video camera according to claim 9, wherein said display displays the movement speed as a number.

12. The video camera according to claim 11, wherein said display comprises a direction indicator that indicates a movement direction of the video camera.

13. The video camera according to claim 9, wherein said display displays a magnitude and a direction of the hand wobble with a circle of a predetermined radius and indicators having magnitude and direction starting from the origin of the circle.

* * * * *